UNITED STATES PATENT OFFICE.

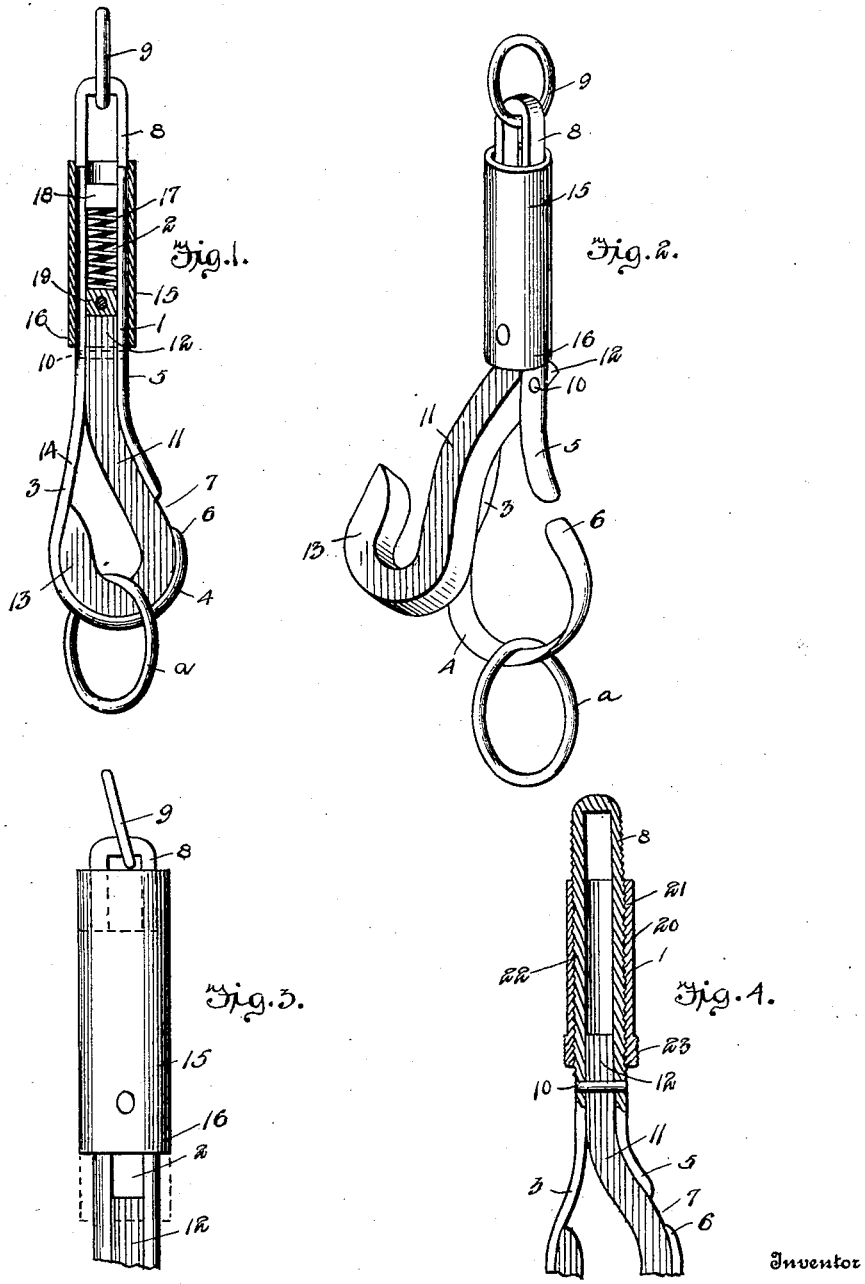

EUGENE STRETCH, OF SHELBYVILLE, ILLINOIS.

HOISTING-HOOK.

No. 910,739.   Specification of Letters Patent.   Patented Jan. 26, 1909.

Application filed July 30, 1908. Serial No. 446,067.

*To all whom it may concern:*

Be it known that I, EUGENE STRETCH, a citizen of the United States, residing at Shelbyville, in the county of Shelby and State of Illinois, have invented certain new and useful Improvements in Hoisting-Hooks, of which the following is a specification, reference being had therein to the accompanying drawing.

This invention relates to improvements in hoisting hooks, and is specially designed for use as a safety hook in sinking mines or wells, or even with derricks, the object of the invention being to so construct a hook, that it will hold a ring or other hook attached to the object to be raised or lowered, without any danger of the ring or hook becoming accidentally unhooked, either by the hook becoming unlocked or the slipping of the ring or hook. To this end, I provide a shank having a supporting end for engagement with the cable or chain, and with a hooked terminal and a short terminal, whose extreme ends are separated by a space. These terminals and the open portion of the shank provide a space in which a hook is pivotally mounted the opening of the hook being disposed oppositely to the opening between the terminals, so that when the body of the hook alines with the terminals, the hook is entirely closed by the body of the hooked terminal of the shank, and a ring or hook of the same character fitting within the pivoted hook, is prevented from becoming disengaged. In order to lock the shank and hook in this position, I employ a spring or screw actuated sleeve, which moves upon the shank toward and from the pivotal point of the hook with the shank and incases the said end of the hook and thus prevents any swinging of the hook, while thus locked.

To clearly illustrate my invention, attention is invited to the accompanying drawings, in which:—

Figure 1 is a side elevation of my hoisting hook, with the locking sleeve in section. Fig. 2 is a perspective view of the hook with the main hook unlocked. Fig. 3 is a view showing the locking sleeve in operation, and Fig. 4 is a similar view to Fig. 1 of a modified form of locking device.

Referring to the drawings:—The numeral 1 designates the shank, which is formed by bending or casting a strip of metal, so as to provide the space or receptacle 2 in the shank, the terminal 3, being provided with the enlarged hooked portion 4, while the terminal 5 is curved outwardly and terminates at a point above the extreme end 6, of the hook 4, so as to provide the space 7, the purpose of which will presently appear. The upper end 8, of the space or receptacle 2, is to receive the supporting ring 9.

Pivotally secured within the space 2 and in the shank by means of the pin 10, is the main or supporting hook 11, whose short end 12, extends above the pin into the space 2, while its hooked end 13 is adapted to be incased within the two terminals of the shank, the opening 14 of the hook, being disposed oppositely to the space or opening 7, so that when a ring, such as *a*, is being supported, the portion 14 of the guard hook 4, will close the opening of the main hook, and thus prevent the ring *a*, from slipping from the main hook. This main hook may be swung in two directions to facilitate the insertion of the ring *a*, but to prevent the swinging thereof, or rather to lock the hook in "safety", I employ the locking sleeve 15, which as shown in Fig. 1, is slidingly mounted upon the shank, so that its lower end 16, can surround and incase the upper end 12 of the main hook, and thus prevent the main hook from being moved. In order to hold this sleeve in locked position, I employ the spring 17, which is mounted between the shank's block 18 and the sleeve's block 19, and exerts a tension toward the block 19.

In Fig. 4, I have shown a modified form of locking sleeve 20, which is provided with interior screw-threads 21 which engage the screw-threads 22, of the shank, the exterior of the sleeve being milled as at 23, so that the sleeve may be turned easily to move the sleeve upward or downward upon the sleeve to release or lock the main hook.

What I claim, as new is:—

1. A hoisting hook, comprising a shank having a supporting end and an incasing safety hook at the opposite end, a main hook pivotally mounted within the shank and having its hook oppositely disposed to the safety hook, and a sleeve mounted upon the shank for locking the main hook when incased.

2. A hoisting hook, comprising a shank provided with an incasing safety hook upon one end, and a supporting means at the other end, a main hook pivotally mounted in the shank and having a short end projecting above the pivotal point, the hook of the main hook being oppositely disposed to the safety hook, and a sleeve slidingly mounted upon the shank for surrounding the shank and the projecting end of the main hook to lock the main hook when incased.

In testimony whereof I affix my signature in presence of two witnesses.

EUGENE STRETCH.

Witnesses:
    ROY KELLY,
    WALTER IGO.